Patented Oct. 29, 1946

2,410,264

UNITED STATES PATENT OFFICE 2,410,264

METHOD OF MAKING STARCH CONVERSION SYRUP

Frank H. Brock and Clifford E. Smith, Decatur, Ill., assignors to A. E. Staley Manufacturing Co., Decatur, Ill., a corporation of Delaware No Drawing. Application January 28, 1944, Serial No. 520,137

3 Claims. (Cl. 127—40)

The present invention relates to the manufacture of a starch conversion syrup. More particularly, it pertains to a novel method of manufacturing starch conversion syrup in which a starch conversion liquor, preferably one having a medium dextrose equivalent content, is subjected to dialysis against water through a semi-permeable membrane to obtain a dialyzate having a comparatively high dextrose equivalent content, and the provision of such a process and product is a principal object of the invention.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the application of which will be indicated in the claims.

The D. E. or Dextrose Equivalent content of a starch conversion syrup is defined as the percentage of reducing sugars, calculated as dextrose, in the dry substance of the syrup. Ordinary starch conversion syrups have a D. E. of about 42. These syrups, on a solids basis, are about 30 per cent as sweet as cane sugar. High D. E. acid-enzyme converted starch syrups have a D. E. of at least 55—65. These high D. E. syrups, on a solids basis, are about 60 per cent as sweet as cane sugar or are twice as sweet as ordinary starch conversion syrups. They are also much more fluid than ordinary starch conversion syrups. They are desirable because of their lower viscosity and higher sweetness as compared with starch conversion syrups having a lower D. E.

The preparation of high D. E. starch conversion syrups of satisfactory flavor requires special processing, because the acid conversion of starch, if carried much above 55 D. E., develops a bitter flavor due to hydrol in the product. To obtain a high D. E. syrup of satisfactory flavor, it is customary to convert starch with an acid to 45-55 D. E., in which range little or no hydrol is formed, and to further convert this product with an enzyme to the high D. E. desired (55-65 D. E.)

Moreover, syrups converted directly by acid hydrolysis to high D. E. contain such a high proportion of dextrose in relation to the other sugars and dextrine that they crystallize readily upon storage.

We have discovered that high D. E. starch syrups of good flavor can be prepared by converting starch with an acid to 45-55 D. E., and subjecting this product to dialysis against water through a semi-permeable membrane. By this process a dialyzate of 55-65 D. E., or higher, may be obtained depending on the conditions of the dialysis.

Dialysis is ordinarily defined as a process of separating materials in true solution from those in colloidal solution by diffusion through a semi-permeable membrane, and to the best of our knowledge the process of dialysis has never been used for any other purpose than to separate colloids from dissolved substances. We, however, have discovered that the process can be used in some cases to separate one soluble substance from another, at least partially, if the conditions are properly designed for that purpose. We, therefore, use the term dialysis to include the process of fractional separation of certain soluble substances by diffusion through a semi-permeable membrane.

The principal components of the solid substance of starch conversion syrups are sugars and soluble dextrins. We have discovered that when a starch conversion syrup is subjected to dialysis under the conditions we shall describe, part of both the sugars and the dextrins diffuse through the membrane, but that the sugars diffuse more rapidly than the dextrins. This produces (1) a dialyzate (material which has diffused through the membrane) which, on a solids basis, is relatively higher in sugars and lower in dextrins than the original syrup, and (2) an undialyzed syrup residue (material which has not diffused through the membrane) which, on a solids basis, is relatively lower in sugars and higher in dextrins than the original syrup. By properly adjusting the conditions of the dialysis the sugar contents of both the dialyzate and of the undialyzed syrup residue can be regulated as desired over considerable ranges of values.

By employing a counter current flow of syrup and of water through a dialyzer it is possible to obtain a higher concentration of sugars in the dialyzate and a lower concentration of sugars in the undialyzed syrup residue than is possible without counter current flow.

In accordance with our process for the preparation of high D. E. corn syrup by dialysis, a syrup of from 45-55 D. E., as desired, is first produced in the ordinary manner by the acid hydrolysis of corn starch. Syrups of lower than 45 D. E. or higher than 55 D. E. may be used in the process but we prefer the range of 45-55 D. E. for our purpose. The syrup is clarified and preferably given one bone char filtration or mild carbon treatment. It may or may not be concentrated, as desired. Syrups of from 30 to 60 per cent solids content have been found to dialyze satisfactorily but syrups of lower or higher concentrations may be used. This syrup is dialyzed preferably against water in a continuous counter current dialyzer. The dialyzate, regulated to the desired D. E. as described below, is subsequently concentrated and decolorized in any suitable manner, to produce the desired high D. E. corn syrup. The undialyzed syrup residue can continuously be recycled as "sweetwater" to the acid converter and further reprocessed, or it can be regulated to any desired D. E. below that of the original syrup, as described below, and can be concentrated and decolorized by any suitable method to produce a desired medium or low D. E. corn syrup.

Example

A 48 D. E. corn syrup, prepared by acid conversion was clarified and given one bone char filtration. This syrup, evaporated to a concentration of 33 per cent solids, was dialyzed and the dialyzate was regulated to 63 D. E. The dialyzate was concentrated and decolorized to produce a finished 63 D. E. corn syrup. The undialyzed syrup residue was regulated to 35 D. E. and recycled to the acid converter to be reprocessed in the dialyzer. As an alternative, the undialyzed syrup residue can be regulated to 42 D. E. and concentrated and decolorized to produce a 42 D. E. corn syrup.

The D. E. of the dialyzate is regulated by use of the proper grade of semi-permeable membrane, by use of an original syrup of the proper D. E. and, to some extent, by the temperature at which the dialysis is run. We prefer to use a Cellophane membrane but any type of semi-permeable membrane of the proper pore size may be used. The grade and wall thickness of a Cellophane membrane must be chosen to give the desired pore size.

Other conditions remaining the same, the higher the D. E. of the original syrup, the higher will be the D. E. of the dialyzate. Also, the higher the D. E. of the original syrup the higher will be the rate of dialysis.

In general, higher temperatures give dialyzates of lower D. E. and higher temperatures increase the rate of dialysis. Temperatures from room temperature to 170° F. are suitable.

The D. E. of the undialyzed syrup residue may be regulated by the rate at which the syrup is run through the dialyzer. The faster the syrup is run through the dialyzer, the less the D. E. of the undialyzed syrup residue will differ from that of the original syrup. Also, the D. E. of the undialyzed syrup residue and the rate of the dialysis may be regulated by the total area of membrane surface in the dialyzer. The smaller the area of the membrane surface, the less the D. E. of the undialyzed syrup residue will differ from that of the original syrup and the lower will be the rate of the dialysis.

It is well known that the acid hydrolysis of corn syrups to high sweetness (i. e. high D. E.) produces considerable hydrol and that the higher the D. E. produced in the conversion, the higher is the hydrol content of the product. Ordinary acid converted "high purity" syrups of from 55 to 65 D. E. have a characteristic objectionable flavor due to their hydrol content. Also, they are extremely liable to crystallize.

By acid converting a syrup to a medium D. E. (45–55 D. E.) at which little or no hydrol is formed and dialyzing the product, a syrup of a relatively high D. E., at least 55–65 with good flavor may be prepared. Syrups as high as 65 D. E. made by this process do not crystallize readily.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In the process of manufacturing a starch conversion syrup which consists in subjecting an aqueous starch suspension to hydrolysis to provide a starch conversion liquor having a dextrose equivalent of between 45–55 per cent, the improvement which comprises subjecting said liquor to dialysis against water through a semi-permeable membrane, and recovering a dialyzate having a dextrose equivalent greater than 55 per cent.

2. In the process of manufacturing a starch conversion syrup which consists in subjecting an aqueous starch suspension to hydrolysis to provide a starch conversion liquor having a dextrose equivalent of between 45–55 per cent, the improvement which comprises subjecting said liquor to dialysis against water through a semi-permeable membrane, and recovering a dialyzate having a dextrose equivalent of between 55–65 per cent.

3. A method of fractionating starch conversion syrup, which comprises providing a starch conversion syrup having a dextrose equivalent in excess of 45 per cent and subjecting the same to dialysis, continuing said dialysis until substantially all of the syrup has been separated into two fractions having substantially different D. E.'s, and recovering the higher D. E. fraction.

FRANK H. BROCK.
CLIFFORD E. SMITH.